United States Patent
Agrawal et al.

(10) Patent No.: US 9,456,004 B2
(45) Date of Patent: Sep. 27, 2016

(54) OPTIMIZING RISK-BASED COMPLIANCE OF AN INFORMATION TECHNOLOGY (IT) SYSTEM

(71) Applicant: GLOBALFOUNDRIES INC., Grand Cayman (KY)

(72) Inventors: Bhavna Agrawal, Armonk, NY (US); Daniel M. Coffman, Bethel, CT (US); Frank A. Schaffa, Hartsdale, NY (US); Robert M. Delmonico, Yorktown Heights, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 77 days.

(21) Appl. No.: 14/297,061

(22) Filed: Jun. 5, 2014

(65) Prior Publication Data

US 2014/0366082 A1 Dec. 11, 2014

Related U.S. Application Data

(60) Provisional application No. 61/832,139, filed on Jun. 6, 2013.

(51) Int. Cl.
*G06F 21/00* (2013.01)
*H04L 29/06* (2006.01)

(52) U.S. Cl.
CPC .......... *H04L 63/20* (2013.01); *H04L 63/1433* (2013.01)

(58) Field of Classification Search
CPC ..................................................... G06F 21/00
USPC .............................................................. 726/1
See application file for complete search history.

(56) References Cited

U.S. PATENT DOCUMENTS

| | | | |
|---|---|---|---|
| 2006/0206615 A1* | 9/2006 | Zheng | H04L 63/0227 709/229 |
| 2007/0067845 A1* | 3/2007 | Wiemer | G06F 21/577 726/25 |
| 2010/0235514 A1* | 9/2010 | Beachem | G06F 21/57 709/227 |
| 2013/0055342 A1* | 2/2013 | Choi | G06F 21/577 726/1 |
| 2013/0091539 A1* | 4/2013 | Khurana | G06F 21/552 726/1 |

OTHER PUBLICATIONS

Mell et al., "A Complete Guide to the Common Vulnerability Scoring System Version 2.0", CVSS, National Institute of Standards and Technology Carnegie Mellon University, Jun. 2007, 23 pages.
(Continued)

*Primary Examiner* — William Powers
(74) *Attorney, Agent, or Firm* — Yuanmin Cai; Andrew M. Calderon; Roberts Mlotkowski Safran Cole & Calderon P.C.

(57) ABSTRACT

For each of a plurality of endpoints of an information technology system having a plurality of security policies, a probability of being safe of each of said endpoints is determined according to each of said security policies. Said determining takes into account probability of security compromise for a single violation of each given one of said security policies. A risk-aware compliance metric is determined for said information technology system based on each of said probabilities of being safe for each of said endpoints and each of said policies. At least one of an operation and a remediation is carried out on said information technology system based on said risk-aware compliance metric. Techniques for optimizing risk-aware compliance are also provided.

20 Claims, 12 Drawing Sheets

(56) References Cited

OTHER PUBLICATIONS

"The overall fastest and best supported solver available," Gurobi Optimization, Inc., www.gurobi.com, 2014, retrieved May 5, 2014, 2 pages.
"CPLEX Optimizer High-performance mathematical programming solver for linear programming, mixed integer programming, mixed integer programming, and quadratic programming", http://www-01.ibm.com/software/commerce/optimization/cplex-optimizer/, IBM, accessed May 5, 2014, 2 pages.
Mell et al., "The NIST Definition of Cloud Computing", National Institute of Standard and Technology, Information Technology Laboratory, Version 15, Oct. 7, 2009, 2 pages.
Pironti, "Developing Metrics for Information Security Governance", Interop Las Vegas, Apr. 30, 2008, 34 pages.
Savola, Towards a Security Metrics Taxonomy for the Information and Communication Technology Industry, VTT Technical Research Centre of Finland, Aug. 2007, 7 pages.
Jansen, "Directions in Security Metrics Research", NIST National Institute of Standards and Technology, U.S. Department of Commerce, Gaithersburg, MD, Apr. 2009, 26 pages.
Bamberger, "Technologies of Compliance: Risk and Regulation in a Digital Age", Texas Law Review, 2009, 61 pages.
Drew, "Information risk management and compliance—expect the unexpected", BT Technology Journal, vol. 25 No. 1, Jan. 2007, 11 pages.
Canfora et al., "A Framework for QoS-Aware Binding and Re-Binding of CompositeWeb Services", RCOST-Research Centre on Software Technology Department of Engineering—University of Sannio, 2008, 42 pages.
Irwin et al., "Balancing Risk and Reward in a Market-based Task Service", IEEE, 2004, 10 pages.
O'Sullivan et al., "What's in a Service?? Towards Accurate Description of Non-Functional Service Properties" Distributed and Parallel Databases, 12, 117-133, 2002, 17 pages.
James, Managing Information Systems Security: a Soft Approach, School of Information Systems, Curtin University, Perth, Australia, IEEE, 1996, 11 pages.
Preda et al., "Semantic Context Aware Security Policy Deployment", In Proceedings of the 4th International Symposium on Information, Computer, and Communications Security, ACM, 2009, 11 pages.
Straub, "Effective IS Security: An Empirical Study", Information Systems Research, vol. 1, No. 3, Sep. 1990, 23 pages.

* cited by examiner

| CHECK # | NON-COMPLIANCE RISK |
|---|---|
| CHECK 1 – SYSTEM FILE PERMISSIONS NOT RESTRICTIVE ENOUGH | HIGH |
| CHECK 2 – PASSWORD COMPLEXITY IS NOT HIGH | MEDIUM |
| CHECK 3 – PASSWORD EXPIRATION DURATION | LOW |
| ........ | ..... |

*FIG. 7*

OPTIMIZING RISK-BASED COMPLIANCE OF AN INFORMATION TECHNOLOGY (IT) SYSTEM

CROSS-REFERENCE TO RELATED APPLICATIONS

This application claims the benefit of U.S. Provisional Application No. 61/832,139 filed on Jun. 6, 2013, which is hereby expressly incorporated herein by reference in its entirety (including its appendices) for all purposes.

STATEMENT OF GOVERNMENT RIGHTS

Not Applicable.

FIELD OF THE INVENTION

The present invention relates to the electrical, electronic and computer arts, and, more particularly, to information technology and the like.

BACKGROUND OF THE INVENTION

A modern information technology (IT) system may include thousands of servers, software components and other devices. Operational security of such a system is usually measured by the compliance of the system with a group of security policies. However, there is no generally accepted method of assessing the risk-aware compliance of an IT system with a given set of security policies. The current practice is to state the fraction of non-compliant systems, regardless of the varying levels of risk associated with violations of the policies and their exposure time windows.

SUMMARY OF THE INVENTION

Principles of the invention provide techniques for optimizing risk-based compliance of an information technology (IT) system. In one aspect, an exemplary method includes determining, for each of a plurality of endpoints of an information technology system having a plurality of security policies, probability of being safe of each of said endpoints according each of said security policies. Said determining takes into account probability of security compromise for a single violation of each given one of said security policies. A further step includes determining a risk-aware compliance metric for said information technology system based on each of said probabilities of being safe for each of said endpoints and each of said policies. An even further step includes carrying out at least one of an operation and a remediation on said information technology system based on said risk-aware compliance metric.

In another aspect, another exemplary method includes determining a compliance metric as a function of a candidate set of remediations to be performed on an information technology system; determining a total cost of remediation as a function of said candidate set of said remediations to be performed on said information technology system; forming an objective function based on said compliance metric and said total cost; and determining an optimal set of said remediations to be performed on said information technology system, based on said objective function, subject to resource and time constraints.

In another aspect, the second method can be combined with the first method.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, the system manager can track the system compliance metric (and thus changes) over time using a single metric, which can be used to further investigate the changes in the system—such as sudden drop in the metric, patterns in the changes in metric over time, gradual decline over time, and the like, some of which may be undesired.

These and other features and advantages of the present invention will become apparent from the following detailed description of illustrative embodiments thereof, which is to be read in connection with the accompanying drawings.

BRIEF DESCRIPTION OF THE DRAWINGS

FIG. 7 shows a table with non-compliance risk categories;

DETAILED DESCRIPTION OF PREFERRED EMBODIMENTS

Cloud Computing Aspects

Figure 1:
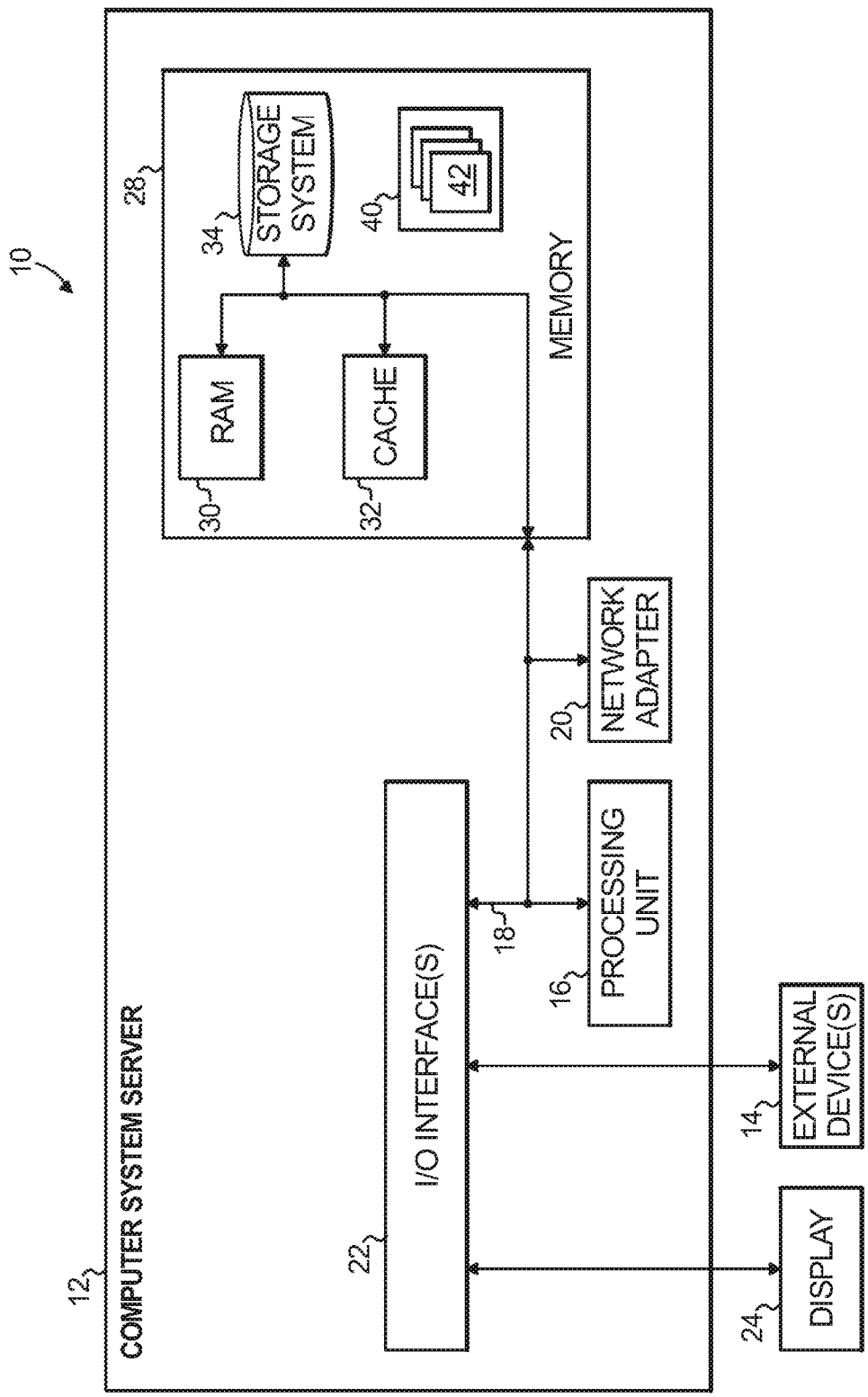
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
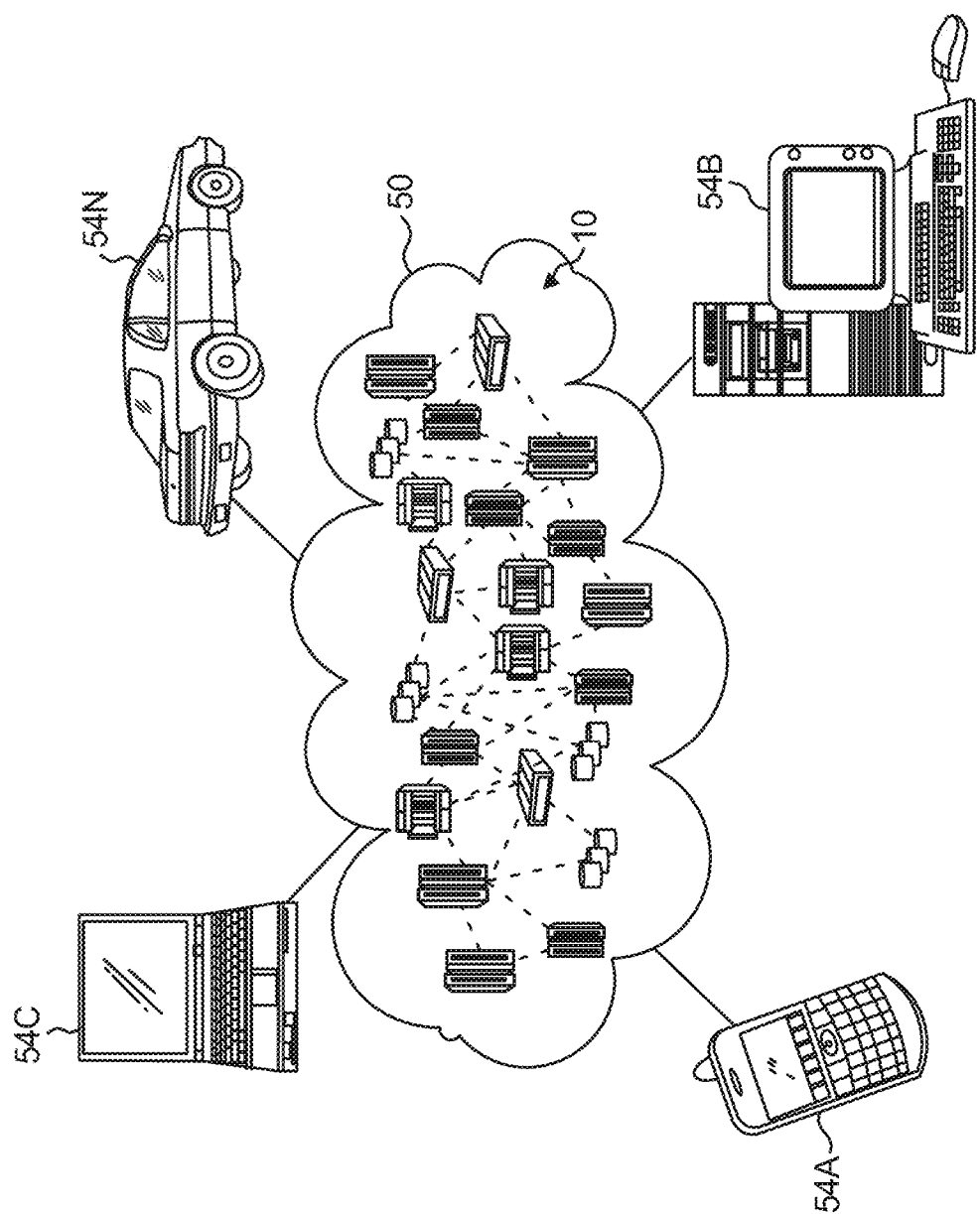
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
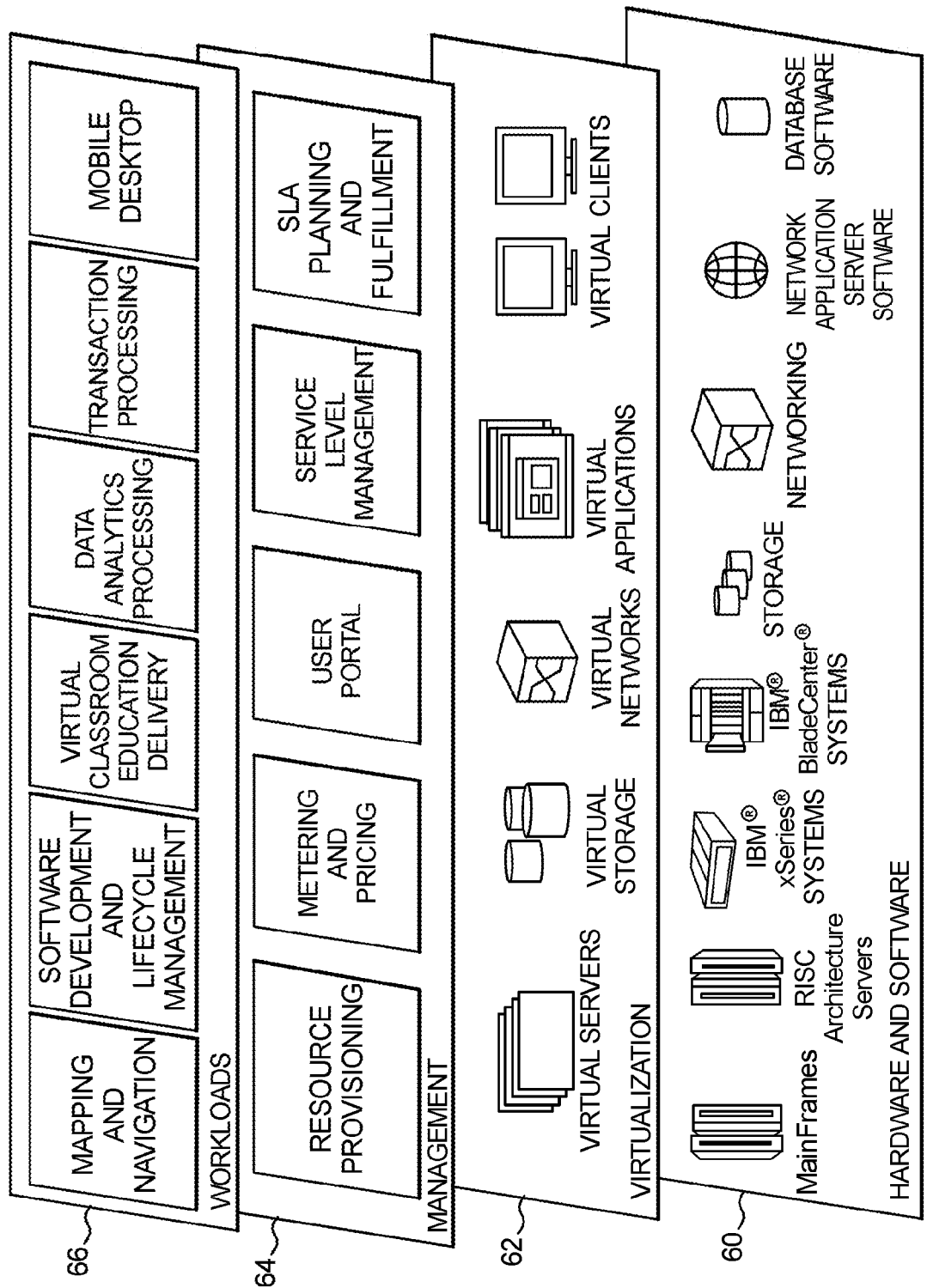
FIG. 3 depicts abstraction model layers according to an embodiment of the present invention.

FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

As noted, a modern information technology (IT) system may include thousands of servers, software components and other devices. Operational security of such a system is usually measured by the compliance of the system with a group of security policies. However, there is no generally accepted method of assessing the risk-aware compliance of an IT system with a given set of security policies. The current practice is to state the fraction of non-compliant systems, regardless of the varying levels of risk associated with violations of the policies and their exposure time windows. One or more embodiments provide a new metric that takes into account the risk of non-compliance, along with the number and duration of violations. This metric affords a risk-aware compliance posture in a single number. It is used to determine a course of remediation, returning the system to an acceptable level of risk while minimizing the cost of remediation and observing the physical constraints on the system, and the limited human labor available. This metric may also be used in the course of the normal operation of the IT system, alerting the operators to potential security breaches in a timely manner.

One or more embodiments relate to risk-aware compliance and/or cloud computing.

Figure 4:
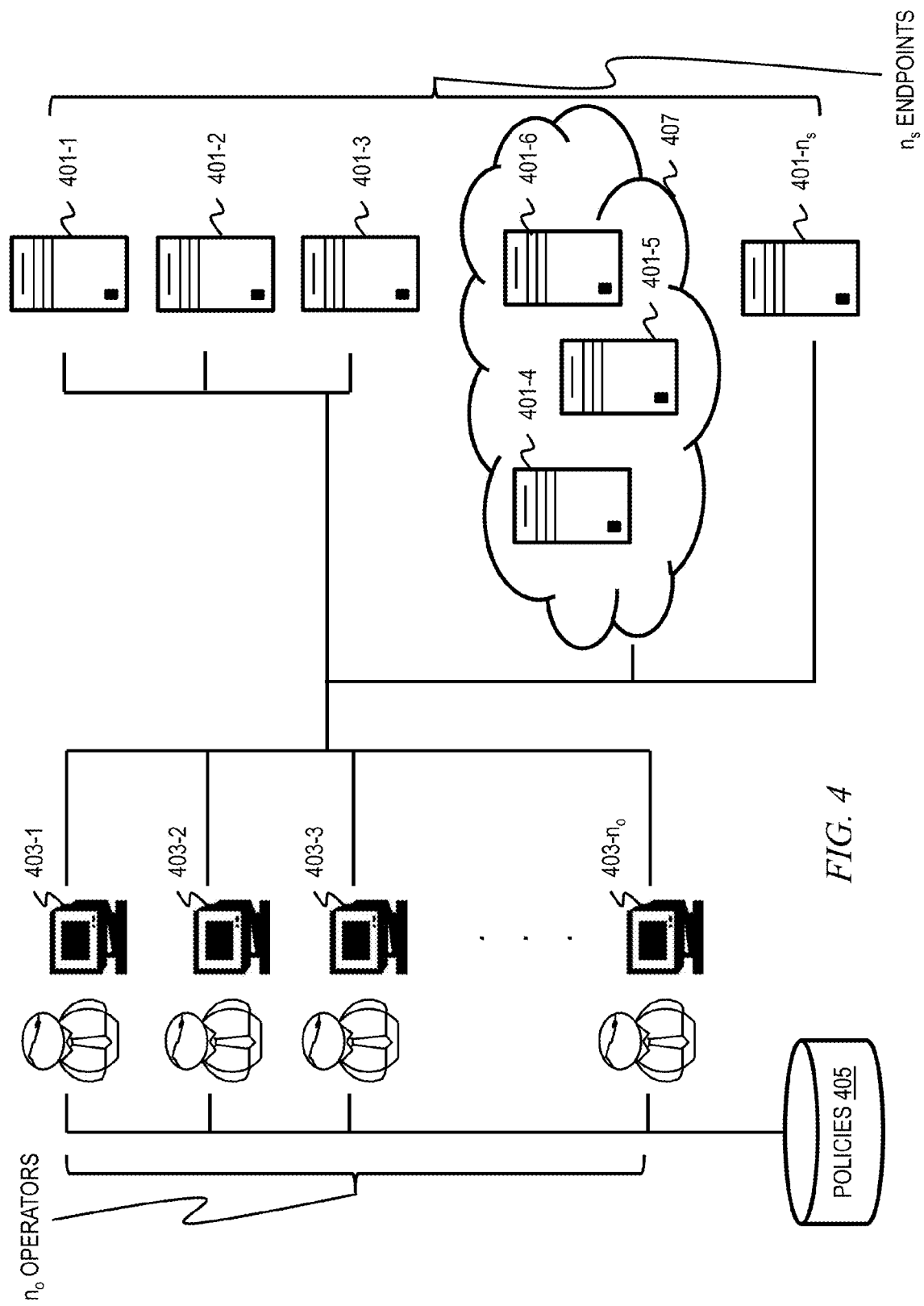
FIG. 4 shows an IT system comprising $n_s$ endpoints under the control of $n_o$ operators.

Modern information technology (IT) systems are large, and disparate. They may include thousands of servers, software components, networks, and other devices. They may be located in one or several data centers. An IT system may contain resources owned by a number of different organizations or individuals, but managed by a single entity. Increasingly, the server systems may not even be physical systems themselves, but may hosted on a number of cloud servers; the server systems are designated herein as endpoints to distinguish them from the cloud servers. FIG. 4 illustrates an IT system including $n_s$ endpoints 401-1 through 401-$n_s$, under the control of $n_o$ operators 403-1 through 403-$n_o$. Endpoints 401-1 through 401-3 and 401-$n_s$ are individual endpoints, while endpoints 401-4 through 401-6 are hosted within cloud 407. The operators apply appropriate security policies 405.

The proper operation of an IT system may be interrupted for a number of reasons. Among them are hardware and software failures, resource limitations and malicious attacks. The former will be addressed through the adoption of monitoring and best practices, but the latter, problems related to a system's security, require special scrutiny. Most often, the managing entity will enumerate the potential threats to the system and will develop and implement a set of policies as a first step of protection from malicious attacks. Such policies may be common to all endpoints or unique to a particularly set of endpoints.

It is the duty of the operators to ensure that each policy is respected on each relevant endpoint. Evidently, not all endpoints will be simultaneously in compliance with each policy. Frequently, there will be a contractual obligation that obliges the managing entity to maintain the endpoints at a certain level of compliance. However, there is no generally adopted method for measuring this level of compliance. Once some violations of the policies have been observed, the system usually must be brought back into as compliant state as possible. Again, there is no generally accepted way to accomplish this.

The current practice for measuring compliance is for the operators to report the fraction of the endpoints not in compliance with one or more policies. This approach, however, has at least three significant weaknesses. It ignores the fact that some violations of policy may be of a much more serious nature than others. Further it ignores the time-dependence of such a violation: some violations are initially not terribly serious, but become much more serious as they are left unrepaired. Finally, some policies may yield only a single result on a single endpoint, whereas others may yield many results; this must be accounted for properly.

An example will prove illustrative. Consider the case of two policies: (i) that passwords must expire after 90 days; and (ii) that on a UNIX system, only the root user may write to the /sbin directory. Obviously, violations of policy ii are potentially much more serious than violations of policy i. However, checking all accounts on an endpoint according to policy i will yield $Q_i$ responses where $Q_i$ is here the number of user accounts with one response per account. On the other hand, checking an endpoint for compliance with policy ii will yield only a single response. Finally, a password being unchanged for a short time after its expiration date will probably cause no harm, but the longer it remains unchanged, the greater the threat it represents that the endpoint's security will be compromised.

One or more embodiments provide a metric which addresses weaknesses in current approaches. One or more embodiments provide a methodology using this metric for restoring the IT system to maximal compliance. Non-limiting examples illustrate how this metric can be used in the daily operations of the IT system.

Risk-aware Compliance Metric

When calculating the compliance posture of an IT system, the current practice ignores the different risks associated with different types of violations. However, such violations may be of very different characters in the risks they pose to the IT system. Evidently, some violations may be much more serious if they are left uncorrected for a substantial length of time. One or more embodiments provide a metric which takes these factors into account.

Consider a single policy k and a single endpoint l. Define $P(N_{kl}, Q_{kl}, R_k)$ as the probability that the endpoint is safe according to policy k. P is given by the binomial distribution:

$$P(N_{kl}, Q_{kl}, R_k) = \sum_{n=0}^{N_{kl}} \binom{Q_{kl}}{n} R_k^n (1-R_i)^{Q_{kl}-n}$$

$Q_{kl}$=Total number of responses from checking policy k on endpoint l $N_{kl}$=number of responses indicating compliance with policy k on endpoint l $R_k$=Risk factor associated with policy k (also probability of compromise for a single violation of policy k)

Here, $$\binom{Q_{kl}}{n}$$

are the usual binomial coefficients (the skilled artisan will be familiar with binomial coefficients per se, and given the teachings herein, will be able to use same to implement one or more embodiments). The risk factors, $R_k$, are assigned values between 0 (lowest risk) & 1 (highest risk) based on the risk associated with the policy. Note that for Q=1, P(0, 1, R)=1−R, that is the probability of being safe (not being at risk) after the detection of a single violation.

Figure 5:
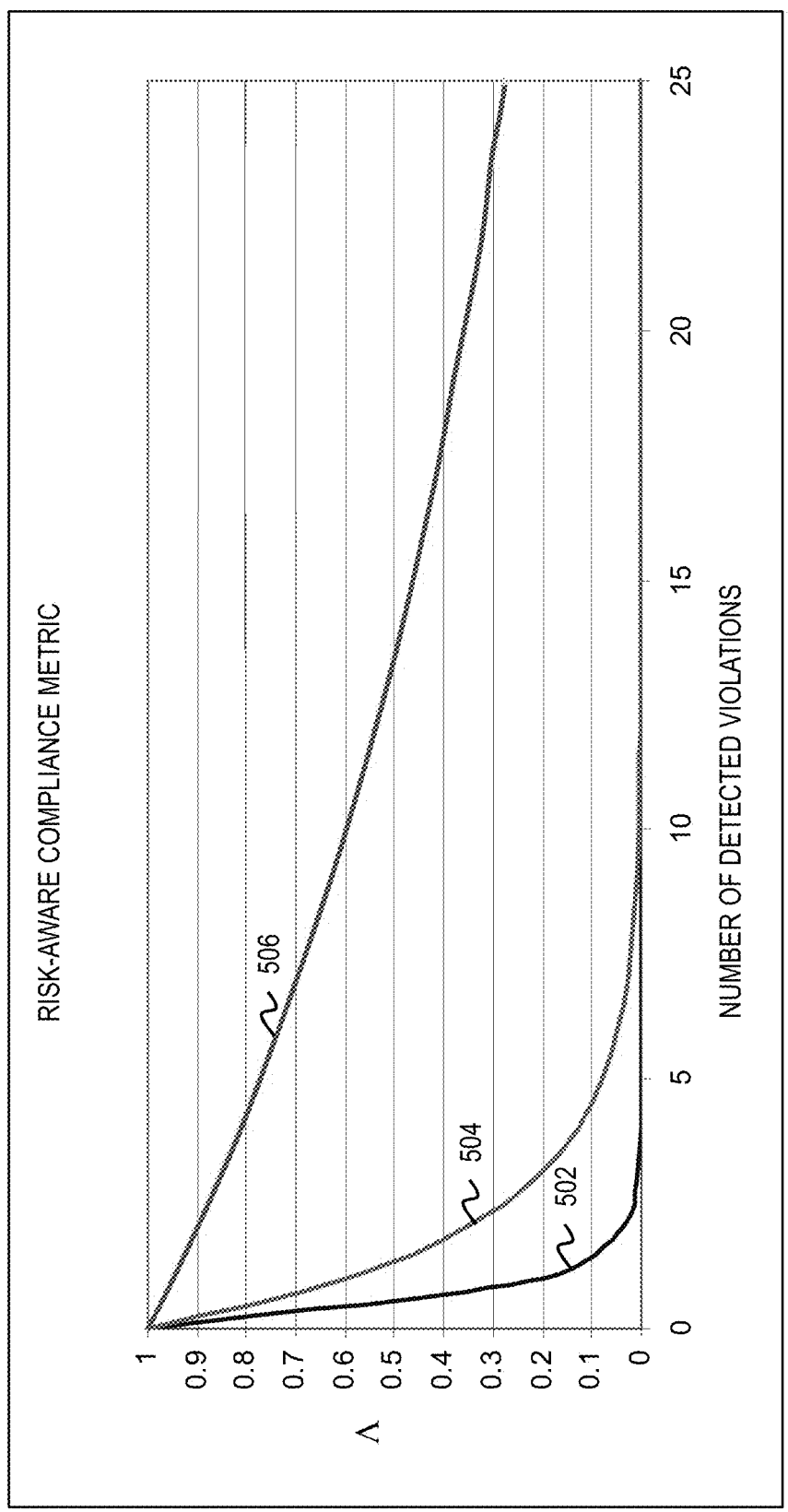
FIG. 5 shows a Risk-aware Compliance Metric as a function of the number of detected violations for three different risk factors.

The risk-aware compliance metric Λ is the product of these probabilities for all endpoints, and all policies.

$$\Lambda = \prod_{k=1}^{n_p} \prod_{l=1}^{n_s} P(N_{kl}, Q_{kl}, R_k)$$

where $n_p$ is the total number of policies being checked on each endpoint, and $n_s$ is the total number of endpoints. The risk factors, $R_k$ are ad hoc for the purposes of this disclosure. They are assessed by the area specialists familiar with the various risks and policies required to protect from those risks. Note that Λ falls very rapidly with the number of detected violations from its maximum value of 1, particularly for high risk policy violations. This is illustrated in FIG. 5, wherein curve 502 is for high-risk policy ($R_k$=0.8); curve 504 is for medium risk policy ($R_k$=0.4), and curve 506 is for low risk policy ($R_k$=0.05).

Figure 6A:
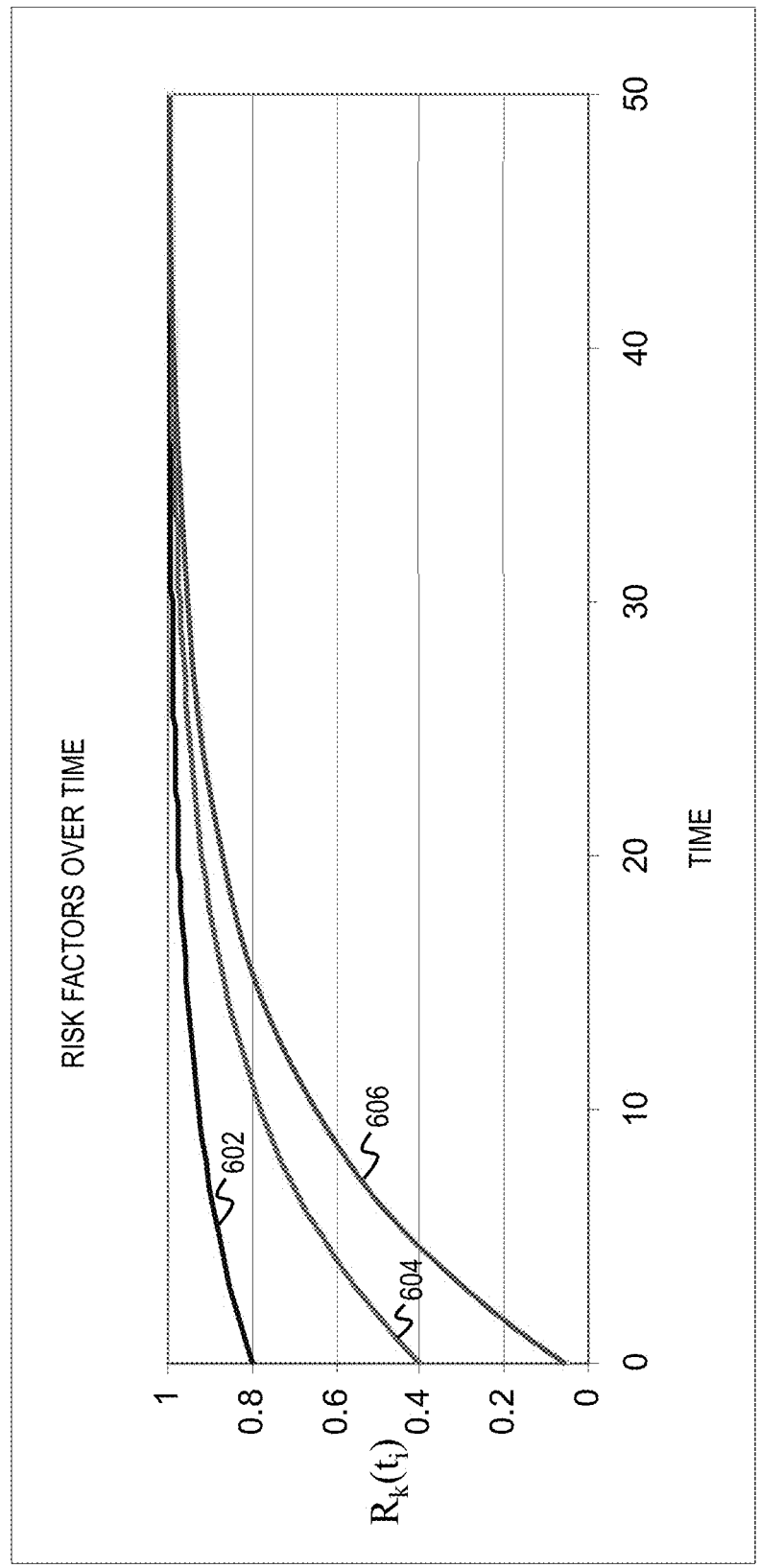
FIG. 6A shows Risk factors as a function of time, for a time constant $\tau=10$ in arbitrary units.
Figure 6B:
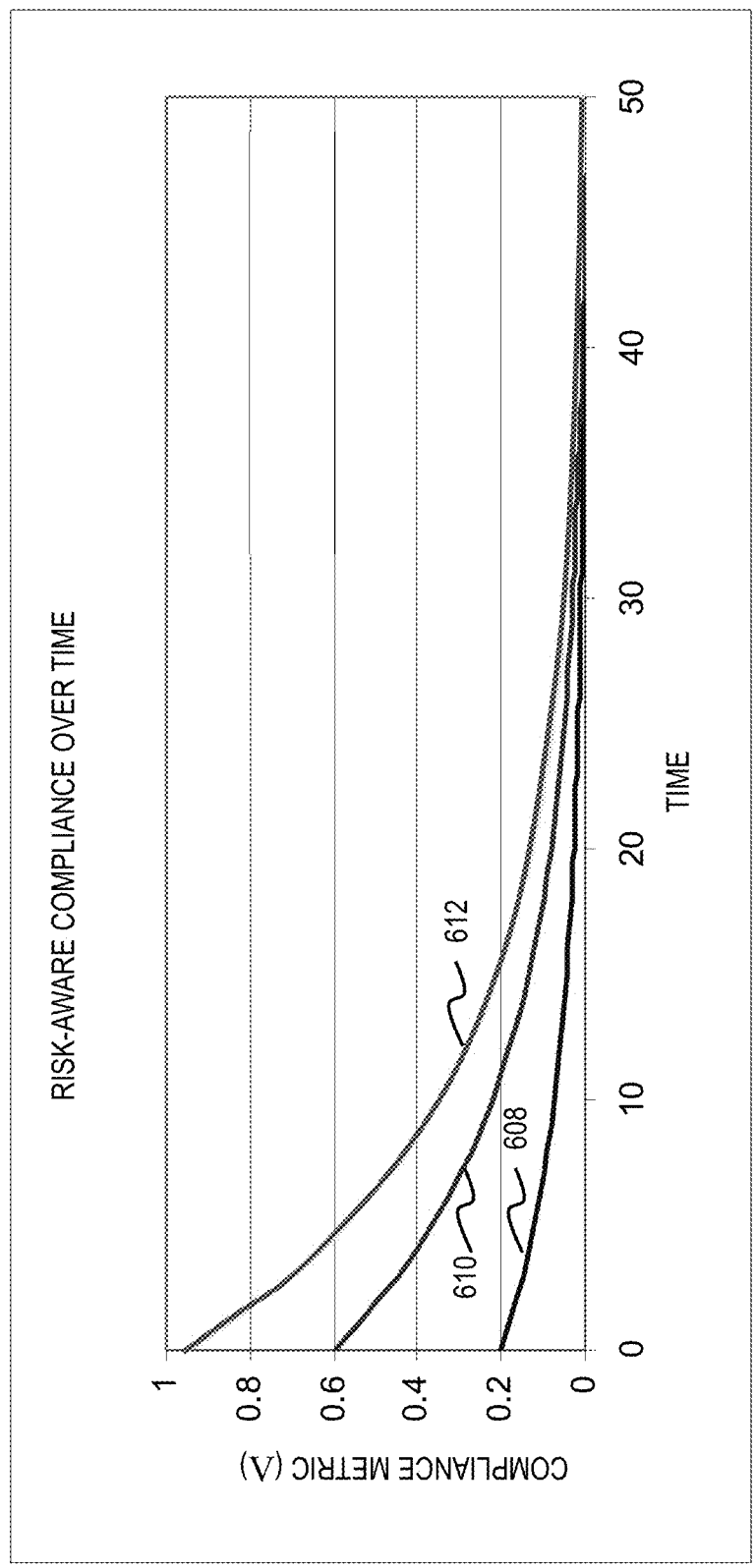
FIG. 6B shows Compliance Metric as a function of time, for a single detected violation and three different risk factors.

The metric may be extended to incorporate the duration of a detected violation, that is, the time elapsed since the violating condition was first observed. One or more embodiments accomplish this by modifying the risk factors to include this duration $$R_k(t_i)=R_k+(1-R_k)(1-e^{-t_i/\tau_k})$$

where $t_i$ is the time for which the detected violation has remained unrepaired, and $\tau_k$ is the criticality time constant for this policy. This function is depicted in FIG. 6A, wherein curve 602 is for high-risk policy ($R_k$=0.8); curve 604 is for medium risk policy ($R_k$=0.4), and curve 606 is for low risk policy ($R_k$=0.05). The corresponding change of Λ is shown in FIG. 6B, wherein curve 608 is for high-risk policy ($R_k$=0.8); curve 610 is for medium risk policy ($R_k$=0.4), and curve 612 is for low risk policy ($R_k$=0.05).

The risk-aware metric is used in several different ways. It functions first as a "tripwire"; the metric is calculated periodically and a message is sent to the operators when the value of the metric falls below some predefined value. This typically indicates that some high risk violation has just been detected. Further, with the incorporation of the duration of observed violations, the value of the metric will degrade even if no new violations are reported. Finally, by observing the pattern of the measured values of the metric over time, it is possible to detect problems in the configuration of the IT system: rather than varying smoothly over time, the metric will exhibit considerable scatter and discontinuous behavior.

Optimal Risk-aware Compliance

Once an IT system becomes non-compliant, the observed violations will need to be remediated. In this section we describe an optimal way to bring the system back to maximal compliance given system and human resource constraints. The system itself contains a finite set of resources such as network bandwidth. The endpoints also are constrained by, say, their available memory or CPU cycles. Each remediation will consume some portion of these resources. Similarly, each remediation will be accompanied by a certain cost, system and human. Finally, the remediation will be performed by human operators, each requiring a certain amount of time for each task and therefore a total time to complete all of their assigned tasks. The time required for the remediation is the longest of these total times. An optimal course of remediation will be accomplished in allowed time, at minimum cost, respecting all of the system resource constraints, and bringing the system back to maximum compliance.

In one or more embodiments, the best remediation solution will maximize the risk-aware metric given above while simultaneously minimizing the costs of such remediation and observing the constraints noted above. Let Δ be the set of remediations to be performed. Define the objective function $$\chi = -\alpha \ln(\Lambda(\Delta)) + C(\Delta)$$

where C is the total cost of remediation and α is an empirical, non-negative scale factor. It will be appreciated that maximizing Λ(Δ) is equivalent to minimizing −ln(Λ(Δ)). Hence, one or more embodiments seek to minimize χ subject to the constraints. The value of α is used to adjust the desired balance of risk and cost. Given the teachings herein, the skilled artisan will be able to pick appropriate values of α as needed for particular circumstances. We further define $\overline{N}$ as the initial number of responses indicating compliance and N is the number of final compliance messages. Hence, Δ=N−$\overline{N}$.

For each of the system resources (e.g., processing unit (PU), memory, disk space, etc.), there is a constraint on the maximum amount available. Each remediation will consume some portion of these resources. The performance of all remediations on a particular endpoint can never consume more than this amount. Furthermore, assuming that there is a maximum time allowed for all remediation work to be completed (e.g. total amount of time across all operators), the time required to perform the remediation must not exceed this maximum. Similarly, each remediation will be accompanied by a certain cost, system and human.

The following subsections describe the cost and constraints for this objective function:

Cost: We use a linear approximation for the cost of remediation, C(Δ).

$$C(\Delta) = \sum_{k=1}^{n_p} C_k \Delta_k$$

$n_p$=number of policies $C_k$ is the cost to repair one violation of policy k, and $\Delta_k$ is the total number of remediations performed according to policy k on all endpoint and by all the operators, which can be further defined as $$\Delta_k = \sum_{j=1}^{n_o} \sum_{l=1}^{n_s} \Delta_{jkl}$$

$n_o$=number of operators
$n_s$=number of endpoints $\Delta_{jkl}$=number of remediations performed by operator j according to policy k on system l While we use linear approximation of cost, this is not required to be linear, and can be generalized without impacting the formulation and solution of the problem.

The optimal system performance then consists in finding that set $\Delta=\{\Delta_{jkl}\}$ which maximizes $\Lambda(\Delta)$ while simultaneously minimizing $C(\Delta)$ subject to the constraints.

Resource Constraints: On endpoint l, there will be an amount of a resource of type m, say $G_{ml}$. The amount must be greater than the amount required by all of the desired remediations. That is $$G_{ml} \geq \sum_{k=1}^{n_p} F_{km}\Delta_{kl}$$

$$\Delta_{kl} = \sum_{j=1}^{n_o} \Delta_{jkl}$$

where here, $F_{km}$ is the amount of a resource of type m required for one remediation according to policy k.

Time Constraints: Operator j will require a time $t_j$ to complete his or her work. This will be to a good approximation $$t_j = \sum_{l=1}^{n_s}\sum_{k=1}^{n_p} T_k \Delta_{jkl}$$

The amount of time to complete all the remediations is given by the longest such time. If the maximum allowable time for all remediations is T then require $$T \geq \max_j(t_j)$$

Objective Function: With the above constraints the objective function that it is desired to minimize, can be re-written as:

$$\chi = -\alpha \ln(\Lambda(\Delta)) + \sum_{k=1}^{n_p} C_k \Delta_k + \sum_{m=1}^{n_R} L_m \sum_{l=1}^{n_s}\left(G_{ml} - \sum_{k=1}^{n_p} F_{km}\Delta_{kl}\right) + \sum_{j=1}^{n_o} \mu_j\left(T - \sum_{l=1}^{n_s}\sum_{k=1}^{n_p} T_k \Delta_{jkl}\right)$$

$n_R$=number of resource types
$L_m$, $\mu_j$ are Lagrange multipliers

For computational tractability, approximate the first term. First, by definition $\ln(\Lambda)=\ln(\Pi P(N,Q,R))=\Sigma \ln(P(N,Q,R))$ Now consider $$\ln\left(P(N, Q, R)\right) = \ln\left(\sum_{n=0}^{N}\binom{Q}{n}R^n(1-R)^{Q-n}\right).$$

Approximate P by $\hat{P}$ where $-\ln(\hat{P}(N,Q,R))=C(Q-N)^2$.

Fix the value of C by requiring $-\ln(\hat{P}(0, Q, R)) = -\ln(P(0, Q, R))$.

Now $$-\ln(\hat{P}(N, Q, R)) = \frac{-\ln(1-R)}{Q}(Q-N)^2$$

With this approximation, the objective function is quadratic in $\Delta$ and may be minimized as an integer programming problem using any of several optimizer packages including CPLEX software, available from International Business Machines Corporation, Armonk, N.Y., US and Gurobi software available from Gurobi Optimization, Inc., Houston, Tex. US.

Discussion: The solution obtained through the optimization procedure above is in fact a course of action. It represents the steps to be taken to render the IT system maximally compliant at minimum cost within the allotted time. As such they aid greatly in the secure operation of the IT system.

In addition, the solution pinpoints the resource or resources that constrain the performance of the system overall. If, for example, one endpoint would benefit from additional RAM, that fact will be reflected in the solution through the corresponding Lagrange multiplier. Similarly, if the allotted time is a fundamental constraint, the optimization procedure will enumerate the benefit to be obtained through the hiring of more personnel.

Some embodiments provide a computer system for identifying one or more remediation measures needed in a plurality of computer systems comprising: one or more inputs that identify one or more compliance statuses of one or more resources on a plurality of computer systems, the compliance statuses being a (security and/or other) compliance of the respective resource with one or more policies; a data structure for storing the policies, one or more risk factors for each of one or more of the compliance statuses, and a cost of one or more remediation measures to bring each of one or more of the resources into compliance with the policies; and an optimizer that provides a set of remediation measures the brings one or more of the compliance status of one or more of the resources into compliance over all the computer systems in a way that minimizes the risk over all the computer systems for a minimum/optimum cost.

In some cases, the data structure further stores one or more resource constraints for one or more of the resources and the optimizer selects a set of remediation measures that minimizes the risk over all the computer systems for a minimum/optimum cost within the resource constraints.

In some embodiments, the data structure further stores one or more time constraints for performing the set of remediation measures and the optimizer selects a set of remediation measures that minimizes the risk over all the computer systems for a minimum/optimum cost within the time constraints.

The time constraints can be varied, for example, by varying a number of human, operator, and/or other resources.

In some cases, the resource includes one or more of the following: disc drive, fire wall, etc.

A variety of different policies and remediation measures can be employed.

A variety of different costs can be dealt with.

The resource and/or time constraints can include a variety of different factors.

It will be appreciated that security and compliance in the IT systems are some of the biggest concerns in IT systems management. Deployment of IT systems within a cloud ecosystem imposes additional complexity and urgency. Security concerns generally lead to a set of policies that the IT system management teams are asked to follow. Compliance of the IT systems to these policies is required by business controls and governance. However, there currently exists no way of determining the risk-aware level of compliance of the IT systems to these policies because not all policies are mitigating the risks to the same level. There is currently no general method for relating this level of compliance to the overall security of the system from typical sets of attacks.

For example, two policies could be "passwords should be changed every 45 days" and "Any core operating system files should not be writable by any user other than root." If the only criteria of compliance was how many policies a system is compliant with, then failing either of the two policies will result in equivalent failure grades (e.g. there is 99% compliance if these were 1 of the 100 requirements). Also, there may be widely differing numbers of user accounts and operating system files on different machines; a proper metric should take this into account as the risks associated with such machines may be quite different. The potential for a security breach and its consequences may be very different in the two cases. One or more embodiments identify a method to define the compliance posture in a single, but meaningful number, and/or a method to use it to improve compliance posture.

One or more embodiments define one or more new compliance metrics which include the risk of non-compliance, along with the usual metrics of failing number of checks, rules, and/or policies, and the number of devices failing compliance. As a starting point, as seen in FIG. 7, the risk can be roughly categorized into three groups; namely, high, medium, and low. In particular, column 702 shows a number of different checks, while column 704 shows the corresponding risk. In a non-limiting example, R_high, R_medium, and R_low are the weights assigned to different risks, which might, for example, be different by orders of magnitude to account for the risk impact.

In one or more embodiments, the compliance metric is computed as:

$$\Lambda = \prod_{k=1}^{n_p} \prod_{l=1}^{n_s} P(N_{kl}, Q_{kl}, R_k)$$

$$P(N_{kl}, Q_{kl}, R_k) = \sum_{n=0}^{N_{kl}} \binom{Q_{kl}}{n} R_k^n (1-R_i)^{Q_{kl}-n}$$

where all the variables have been defined earlier. It will be appreciated that $0 \leq \Lambda \leq 1$. The risk factors are given as ad hoc constants in the range 0 to 1 with 0 indicating no risk and 1 indicating maximum risk. The metric decreases very quickly for increasing incidence of high-risk non-compliance, but increases much more slowly for low-risk non-compliance.

The metric may be extended to the case where the risk associated with non-compliance increases over time. Here, the risk weight factor becomes a function of the time for which the system has remained non-compliant. That is, $R_k(t_i) = f(R_k, t_i, \tau_k)$, where here $t_i$ is the time for which the system has remained non-compliant, and $\Sigma_k$ is the "time window" associated with policy k. An acceptable function is:

$$R_k(t_i) = R_k + (1-R_k)(1-e^{-t_i/\tau_k})$$

Further, even if no such time windows are imposed, the value of lambda may be evaluated repeatedly, each time new values of $N_{kl}$ and $Q_{kl}$ are acquired. In this way, $\Lambda$ may be used to track how the compliance of the ensemble of systems changes over time.

Figure 8B:
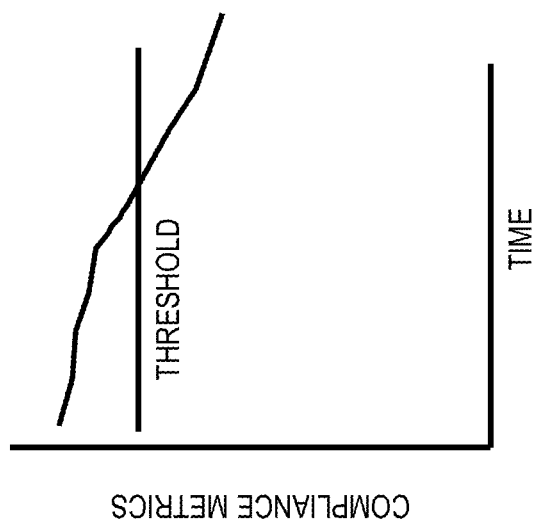
FIGS. 8A-8D show compliance metric plotted versus time in the context of various techniques for improving risk-based compliance.
Figure 8A:
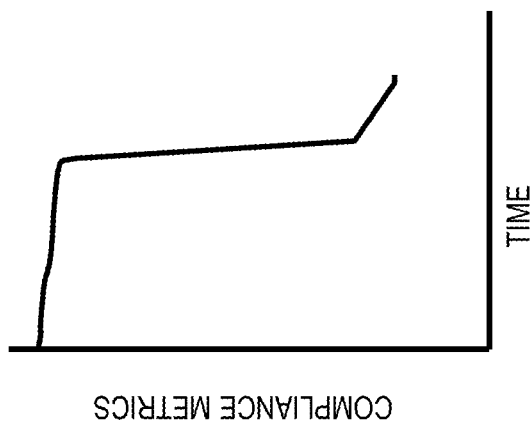
Figure 8D:
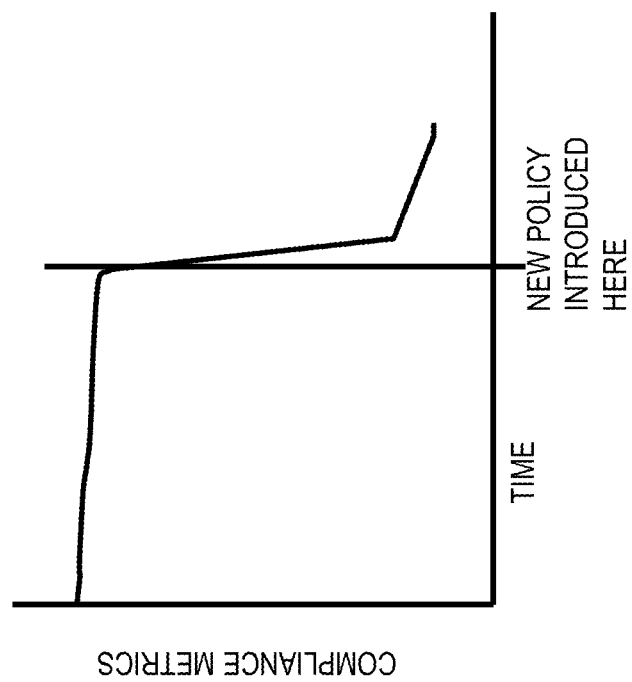
Figure 8C:
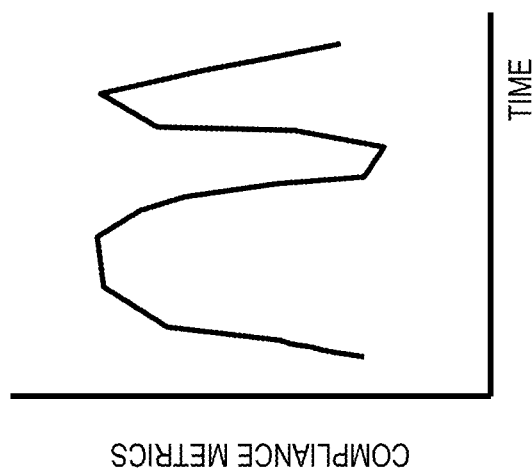
Figure 9:
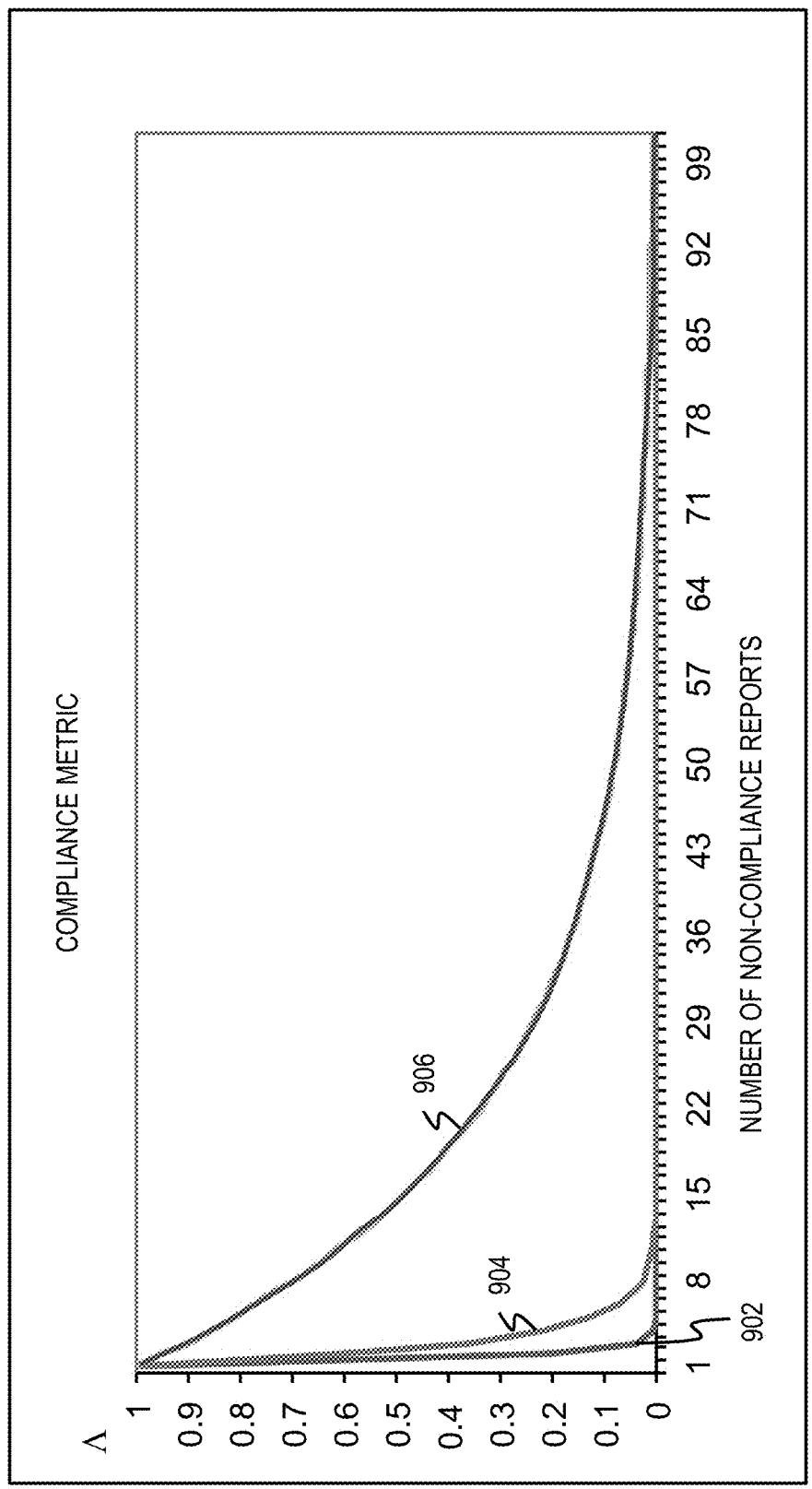
FIG. 9 shows compliance metric versus number of non-compliance reports for three different risk levels.

One or more embodiments improve risk-based compliance by issuing and alert when there is a sudden drop in compliance metrics (high priority violation just occurred), as seen in FIG. 8A; a gradual degradation (uncorrected low priority violation crossed a threshold), as seen in FIG. 8B; or excessive scatter in metrics, as seen in FIG. 8C. In another aspect, illustrated in FIG. 8D, find patterns of compliance changes. For example, correlate policy introductions to compliance postures and/or carry out one or more system-wide trend analyses (investigate repeated system-wide changes in compliance metrics). Then, adjust scan rates in order to observe high-risk policies more often and/or mitigate the cost of computation. FIG. 9 shows the compliance metric for policy Risk Factors of 0.8 (curve 902), 0.4 (curve 904), and 0.05 (curve 906).

It will thus be appreciated that while currently there are no known risk-based compliance metrics for IT systems, one or more embodiments provide one or more new risk-based compliance metrics for an IT system, as well as techniques to use these metrics to improve compliance posture.

Given the discussion thus far, it will be appreciated that, in general terms, an exemplary method, according to an aspect of the invention, includes the step of determining, for each of a plurality of endpoints 401-1 through 401-$n_s$ of an information technology system having a plurality of security policies 405, probability of being safe of each of said endpoints according to each of said security policies. Said determining takes into account probability of security compromise for a single violation of each given one of said security policies. Referring also to the block diagram of FIG. 10, this step can be carried out, for example, by policy compliance scanner 1002 using data 1010 on the risk per policy. A further step includes determining a risk-aware compliance metric for said information technology system based on each of said probabilities of being safe for each of said endpoints and each of said policies. This step can be carried out, for example, by compliance metrics model 1004 based on output 1003 (e.g., deviations) of scanner 1002. Note that probability can, but need not be, binomial distribution. Probability can be defined in different ways. In some cases, determining a risk-aware compliance metric for said information technology system based on each of said probabilities of being safe for each of said endpoints and each of said policies includes determining a risk-aware compliance metric for said information technology system as a product of each of said probabilities of being safe for each of said endpoints and each of said policies. A still further step includes carrying out at least one of an operation and a remediation on said information technology system based on said risk-aware compliance metric. Refer to FIGS. 8A-8D and discussion thereof.

In some cases, said carrying out said at least one of an operation and a remediation on said information technology system based on said risk-aware compliance metric comprises determining a remediation plan for said information technology system by maximizing said risk-aware compliance metric while minimizing remediation costs, subject to at least one of resource constraints and time constraints. This step can be carried out, for example, with optimization engine 1006, with inputs including cost model 1016, operational constraints 1014, and the output of compliance metrics model 1004.

In one or more embodiments, the result is an optimized remediation plan 1018.

In some instances, said carrying out of said at least one of an operation and a remediation on said information technology system based on said risk-aware compliance metric further comprises remediating said information technology system in accordance with said remediation plan. This step can be carried out by human operators and/or with operations/remediations block 1008. In one or more embodiments, elements 1002, 1004, 1006, and optionally 1008, are loosely coupled cooperative software modules. Again, remediation 1008 can be done by a person (human operator) acting on the physical system (e.g., FIG. 4) in accordance with the plan.

In another aspect, one entity may determine the plan and may then provide it to a separate entity for implementation. Thus, in some cases, said carrying out said at least one of an operation and a remediation on said information technology system based on said risk-aware compliance metric further comprises providing said remediation plan to an operator of said information technology system.

In some cases, in said step of determining said probability of being safe, said determining further takes into account probability of security compromise for a single violation of each given one of said security policies as a function of duration of said single violation.

In some such cases, said steps of determining said probability of being safe of each of said endpoints and determining said risk-aware compliance metric are periodically repeated. Said carrying out of said at least one of an operation and a remediation on said information technology system based on said risk-aware compliance metric then comprises issuing an alert 1012 if said risk-aware compliance metric for said information technology system falls below a predetermined value. This could be, for example, due to sudden high-risk violation or ongoing violation (the latter when duration is considered).

In some such cases, said steps of determining said probability of being safe of each of said endpoints and determining said risk-aware compliance metric are periodically repeated. Said carrying out of said at least one of an operation and a remediation on said information technology system based on said risk-aware compliance metric comprises issuing an alert 1012 if said risk-aware compliance metric for said information technology system varies excessively over time.

In some such cases, said steps of determining said probability of being safe of each of said endpoints and determining said risk-aware compliance metric are periodically repeated. Said carrying out of said at least one of an operation and a remediation on said information technology system based on said risk-aware compliance metric comprises observing patterns of change in said risk-aware compliance metric to gain insight into operation of said information technology system (e.g., feedback aspect of 1012). For example, it is possible to look for correlations between policy changes and sudden changes in compliance metric.

In some such cases, said steps of determining said probability of being safe of each of said endpoints and determining said risk-aware compliance metric are periodically repeated. In one aspect, a further step then includes adjusting a frequency at which said steps of determining said probability of being safe of each of said endpoints and determining said risk-aware compliance metric are repeated, to implement at least one of: observing high-risk policies with greater frequency and mitigating computation cost.

In another aspect, with reference to the above discussion of the Objective Function, another exemplary method includes determining a compliance metric $\Lambda$ as a function of a candidate set of remediations $\Delta$ to be performed on an information technology system. This step can be carried out with optimization engine 1006, based on input from compliance metrics model 1004. A further step includes determining a total cost C of remediation as a function of said candidate set of said remediations $\Delta$ to be performed on said information technology system. This step can be carried out with optimization engine 1006, based on input from cost model 1016. Still further steps include forming an objective function $\chi$ based on said compliance metric and said total cost (e.g., with optimization engine 1006); and determining an optimal set of said remediations to be performed on said information technology system, based on said objective function, subject to resource and time constraints as discussed above (e.g., with optimization engine 1006, obtaining as input said operational constraints 1014). For example, minimize $\chi$.

In some cases, said determining of said total cost comprises taking into account cost of human operators carrying out remediation and costs of system resources needed for carrying out remediation.

In some cases, a further step includes remediating said information technology system in accordance with said optimal set of said remediations.

Thus, in one or more embodiments employ the objective function to maximize the compliance metric and minimize the cost (cost includes, for example, human beings carrying out remediation and system resources needed to remediate (central processing unit (CPU), bandwidth, memory, etc.)).

In another aspect, a computer program product can be provided, comprising a computer readable storage medium having program instructions embodied therewith. The program instructions are executable by a processor to cause the processor to perform any one, some, or all of the method steps disclosed herein.

Figure 10:
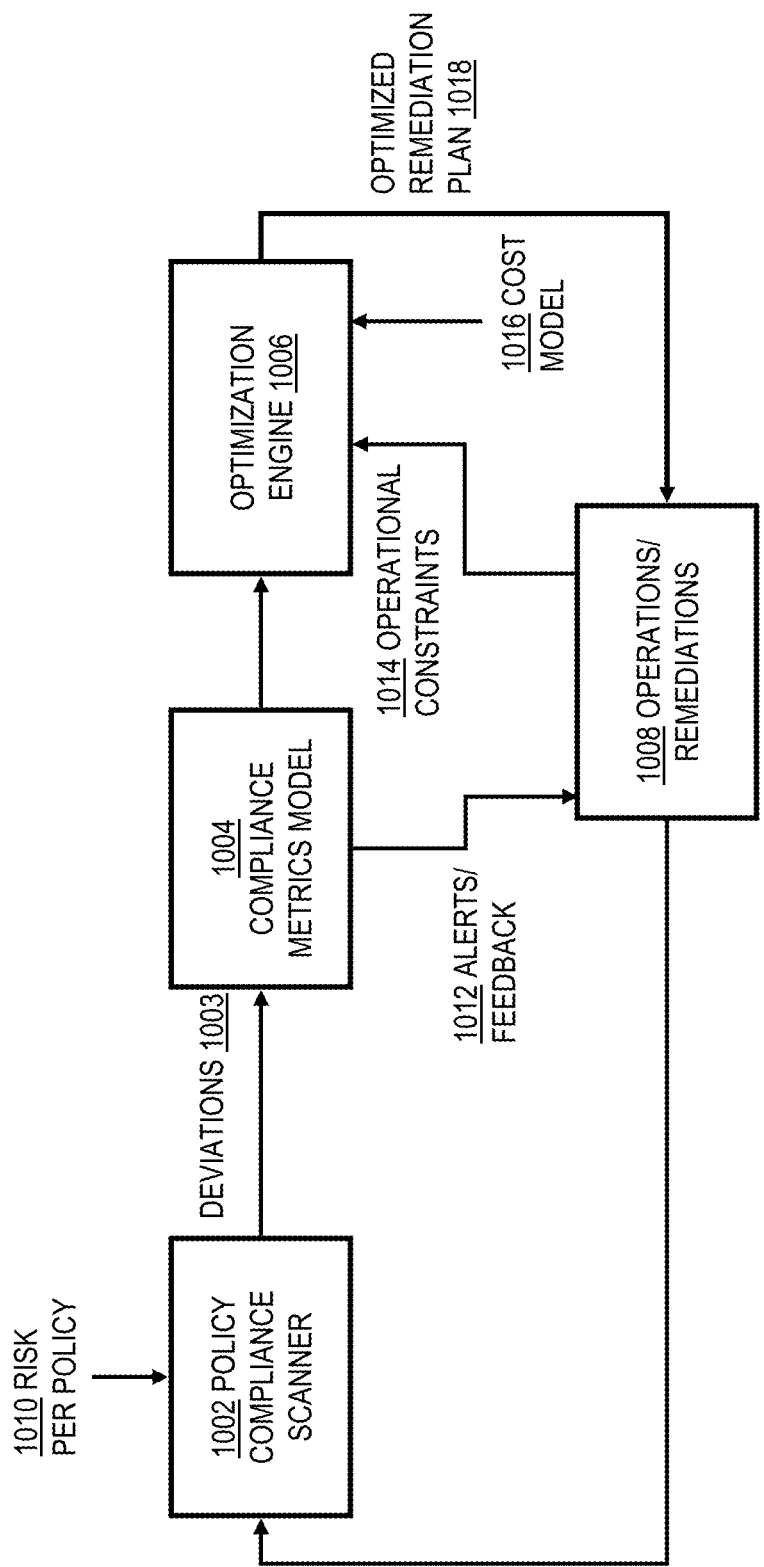
FIG. 10 shows a system block diagram according to an embodiment of the present invention.

It should be noted that any of the methods described herein can include an additional step of providing a system comprising distinct software modules embodied on a computer readable storage medium; the modules can include, for example, any or all of the appropriate elements depicted in the block diagrams in any of the pertinent figures and/or described herein; by way of example and not limitation, any one, some or all of the modules/blocks and or sub-modules/sub-blocks in FIG. 10, such as modules to implement elements 1002, 1004, 1006, and 1008 (e.g., high-level code implementing the corresponding equations disclosed herein). In some embodiments, a suitable UI is provided in the form of a GUI comprising html served out to the browser of a user's computer. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising the steps of:
   determining, for each of a plurality of endpoints of an information technology system having a plurality of security policies, probability of being safe of each of said endpoints according to each of said security policies, wherein said determining takes into account probability of security compromise for a single violation of each given one of said security policies;
   determining a risk-aware compliance metric for said information technology system based on each of said probabilities of being safe for each of said endpoints and each of said policies; and
   carrying out at least one of an operation and a remediation on said information technology system based on said risk-aware compliance metric.

2. The method of claim 1, wherein said carrying out said at least one of an operation and a remediation on said information technology system based on said risk-aware compliance metric comprises determining a remediation plan for said information technology system by maximizing said risk-aware compliance metric while minimizing remediation costs, subject to at least one of resource constraints and time constraints.

3. The method of claim 2, wherein said carrying out said at least one of an operation and a remediation on said information technology system based on said risk-aware compliance metric further comprises remediating said information technology system in accordance with said remediation plan.

4. The method of claim 2, wherein said carrying out said at least one of an operation and a remediation on said information technology system based on said risk-aware compliance metric further comprises providing said remediation plan to an operator of said information technology system.

5. The method of claim 1, wherein, in said step of determining said probability of being safe, said determining further takes into account probability of security compromise for a single violation of each given one of said security policies as a function of duration of said single violation.

6. The method of claim 5, further comprising periodically repeating said steps of determining said probability of being safe of each of said endpoints and determining said risk-aware compliance metric, wherein said carrying out said at least one of an operation and a remediation on said information technology system based on said risk-aware compliance metric comprises issuing an alert if said risk-aware compliance metric for said information technology system falls below a predetermined value.

7. The method of claim 5, further comprising periodically repeating said steps of determining said probability of being safe of each of said endpoints and determining said risk-aware compliance metric, wherein said carrying out said at least one of an operation and a remediation on said information technology system based on said risk-aware compliance metric comprises issuing an alert if said risk-aware compliance metric for said information technology system varies over time.

8. The method of claim 5, further comprising periodically repeating said steps of determining said probability of being safe of each of said endpoints and determining said risk-aware compliance metric, wherein said carrying out said at least one of an operation and a remediation on said information technology system based on said risk-aware compliance metric comprises observing patterns of change in said risk-aware compliance metric to gain insight into operation of said information technology system, the patterns of change are based on correlating a policy introduction to a change in the risk-aware compliance metric, wherein the policy introduction e after a password change after a specific time period has passed.

9. The method of claim 5, further comprising:
   periodically repeating said steps of determining said probability of being safe of each of said endpoints and determining said risk-aware compliance metric; and
   adjusting a frequency at which said steps of determining said probability of being safe of each of said endpoints and determining said risk-aware compliance metric are repeated, to implement at least one of:
   observing high-risk policies with greater frequency and mitigating computation cost.

10. The method of claim 1, wherein determining said risk-aware compliance metric for said information technology system based on each of said probabilities of being safe for each of said endpoints and each of said policies comprises determining said risk-aware compliance metric for said information technology system as a product of each of said probabilities of being safe for each of said endpoints and each of said policies.

11. The method of claim 1, wherein:
   said step of determining said probability of being safe of each of said endpoints according each of said security policies is carried out with a policy compliance scanner module, embodied on a non-transitory computer-readable storage medium, and obtaining as input risk per policy, executing on at least one hardware processor; and
   said step of determining said risk-aware compliance metric for said information technology system is carried out with a compliance metrics model module, embodied on said non-transitory computer-readable storage medium, executing on said at least one hardware processor.

12. A method comprising the steps of:
   determining a compliance metric as a function of a candidate set of remediations to be performed on an information technology system;
   determining a total cost of remediation as a function of said candidate set of said remediations to be performed on said information technology system;
   forming an objective function based on said compliance metric and said total cost; and determining an optimal set of said remediations to be performed on said information technology system, based on said objective function, subject to resource and time constraints.

13. The method of claim 12, wherein said determining of said total cost comprises taking into account cost of human operators carrying out remediation and costs of system resources needed for carrying out remediation.

14. The method of claim 13, further comprising remediating said information technology system in accordance with said optimal set of said remediations.

15. The method of claim 12, wherein:
said step of determining said compliance metric as said function of said candidate set of said remediations to be performed on said information technology system is carried out with an optimization engine module, embodied on a non-transitory computer-readable storage medium, based on input from a compliance metrics model, and executing on at least one hardware processor;
said step of determining said total cost of remediation as said function of said candidate set of said remediations to be performed on said information technology system is carried out with said optimization engine module, embodied on said non-transitory computer-readable storage medium, obtaining as input a cost model, and executing on said at least one hardware processor;
said step of forming said objective function based on said compliance metric and said total cost is carried out with said optimization engine module, embodied on said non-transitory computer-readable storage medium, and executing on said at least one hardware processor; and
said step of determining said optimal set of said remediations to be performed on said information technology system, based on said objective function, subject to said operational constraints, is carried out with said optimization engine module, embodied on said non-transitory computer-readable storage medium, obtaining as input said operational constraint, and executing on said at least one hardware processor.

16. A computer program product comprising a non-transitory computer readable storage medium having program instructions embodied therewith, the program instructions executable by a processor to cause the processor to perform a method comprising:
determining, for each of a plurality of endpoints of an information technology system having a plurality of security policies, probability of being safe of each of said endpoints according each of said security policies, wherein said determining takes into account probability of security compromise for a single violation of each given one of said security policies;
determining a risk-aware compliance metric for said information technology system based on each of said probabilities of being safe for each of said endpoints and each of said policies; and
carrying out at least one of an operation and a remediation on said information technology system based on said risk-aware compliance metric.

17. The computer program product of claim 16, wherein said carrying out said at least one of an operation and a remediation on said information technology system based on said risk-aware compliance metric comprises determining a remediation plan for said information technology system by maximizing said risk-aware compliance metric while minimizing remediation costs, subject to at least one of resource constraints and time constraints.

18. The computer program product of claim 16, wherein, in said step of determining said probability of being safe, said determining further takes into account probability of security compromise for a single violation of each given one of said security policies as a function of duration of said single violation.

19. The computer program product of claim 16, further comprising program instructions executable by the processor to cause the processor to periodically repeat said steps of determining said probability of being safe of each of said endpoints and determining said risk-aware compliance metric, wherein said carrying out said at least one of an operation and a remediation on said information technology system based on said risk-aware compliance metric comprises issuing an alert if said risk-aware compliance metric for said information technology system falls below a predetermined value, wherein a value of the risk-aware compliance metric degrades as a violation is reported and continues to degrade over time.

20. A computer program product comprising a computer readable storage medium having program instructions embodied therewith, the program instructions executable by a processor to cause the processor to perform a method comprising:
determining a compliance metric as a function of a candidate set of said remediations to be performed on an information technology system;
determining a total cost of remediation as a function of said candidate set of said remediations to be performed on said information technology system;
forming an objective function based on said compliance metric and said total cost; and
determining an optimal set of said remediations to be performed on said information technology system, based on said objective function, subject to resource and time constraints.

* * * * *